US012562955B1

(12) United States Patent
Mack et al.

(10) Patent No.: US 12,562,955 B1
(45) Date of Patent: Feb. 24, 2026

(54) INTEGRATED ACTIVE NETWORK PERFORMANCE MONITORING ACROSS VANTAGE POINTS

(71) Applicant: Cisco Technology, Inc., San Jose, CA (US)

(72) Inventors: Ryan Michael Mack, Guilford, CT (US); Filippo Ardito, Mont-sur-Rollem (CH); Nikhil Benjamin Pulimood, New York, NY (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 18/811,103

(22) Filed: Aug. 21, 2024

(51) Int. Cl.
    *H04L 67/51*        (2022.01)
    *H04L 41/0631*      (2022.01)
    *H04L 41/5009*      (2022.01)

(52) U.S. Cl.
    CPC ...... *H04L 41/0631* (2013.01); *H04L 41/5009* (2013.01); *H04L 67/51* (2022.05)

(58) Field of Classification Search
    None
    See application file for complete search history.

(56) References Cited

U.S. PATENT DOCUMENTS

| 10,848,403 B1 | 11/2020 | Schroeder |
| 2008/0177874 A1 | 7/2008 | Mullarkey |

| 2020/0044943 A1* | 2/2020 | Bor-Yaliniz ........... H04L 41/40 |
| 2021/0126844 A1 | 4/2021 | Haddow et al. |
| 2023/0034229 A1 | 2/2023 | Oliveira et al. |

FOREIGN PATENT DOCUMENTS

| WO | 2011144041 A2 | 11/2011 |

OTHER PUBLICATIONS

Cisco: "Chapter: Configuring IP SLAs UDP Jitter Operations", IP Addressing Configuration Guide, Cisco IOS XE 17.x, Last updated on Nov. 15, 2022, retrieved from https://www.cisco.com/c/en/US/td/docs/routers/ios/config/17-x/ip-addressing/b-ip-addressing/m_sla_udp_jitter-xe.html on Jun. 3, 2024, pp. 1-20.
Cisco: "Chapter: IP SLAs Overview", IP Addressing Configuration Guide, Cisco IOS XE 17.x, Last updated on Nov. 15, 2022, retrieved from https://www.cisco.com/c/en/us/td/docs/routers/ios/config/17-x/ip-addressing/b-ip-addressing/m_sla_overview.html on Jun. 3, 2024, pp. 1-9.
Cisco Thousandeyes: "What Is Network Device Monitoring?", Accessed on Jun. 3, 2024, retrieved from https://www.thousandeyes.com/solutions/network-device-monitoring, 7 Pages.
(Continued)

*Primary Examiner* — Cai Y Chen
(74) *Attorney, Agent, or Firm* — Merchant & Gould P.C.

(57) ABSTRACT

In one implementation, a device identifies a node in a network that is not running a particular type of network metric monitoring agent. The device requests network metrics from the node collected using a network metric monitoring approach that differs from that of the particular type of network metric monitoring agent. The device obtaining, by the device, the network metrics collected by the node. The device combines the network metrics collected by the node with results from an agent of the particular type of network monitoring agent, to identify a root cause of a performance degradation in the network.

20 Claims, 7 Drawing Sheets

(56) References Cited

OTHER PUBLICATIONS

Gridelli S., "SNMP vs. NetBeez", Netbeez, Network Monitoring, Oct. 25, 2017, retrieved from https://netbeez.net/blog/snmp-vs-netbeez/, pp. 1-6.
Siddiqui L., "SNMP & SNMP Monitoring, Explained", Splunk a Cisco Company, Splunk Blogs, Jun. 6, 2023, Retrieved from https://www.splunk.com/en_us/blog/learn/snmp-monitoring.html, pp. 1-11.

* cited by examiner

100

DATABASES
106

SERVERS
104

NETWORK(S)
110

140

CLIENT n
102

CLIENT 1
102

300

700

705 Start

710 Identify Network Node Not Running Particular Type of Monitoring Agent

715 Request Network Metrics From Node Collected Using Different Monitoring Approach 720 Obtain Metrics Collected by Node 725 Combine Metrics with Those of Agent to Identify Root Cause of Degradation in Network 730 End

INTEGRATED ACTIVE NETWORK PERFORMANCE MONITORING ACROSS VANTAGE POINTS

TECHNICAL FIELD

The present disclosure relates generally to computer networks and more particularly to integrated active network performance monitoring across vantage points.

BACKGROUND

Active Network Performance Monitoring (ANPM) relies on end-to-end Layer-3 connectivity. Traditional path trace tools, such as those based on the Internet Control Message Protocol (ICMP) and time-to-live (TTL), are limited in that they can only provide information regarding the performance along the specific path that the path trace traffic takes from the source to the destination.

In large networks, current monitoring solutions often require the deployment of an ANPM agent on every possible path through which traffic can flow. This necessitates installing monitoring software on all switches, routers, and endpoints within the network. While this comprehensive deployment can offer a complete view of the network performance, it is not always feasible. Indeed, many network devices do not support the installation of ANPM agents, leaving gaps in the monitoring coverage.

Consequently, when an outage occurs on a network device that does not have an ANPM agent installed, pinpointing the exact location and cause of the outage becomes challenging. This can translate to increased downtime, transaction delays, critical communication interruptions, significant operational degradations, losses, and various other negative outcomes.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device identifies a node in a network that is not running a particular type of network metric monitoring agent. The device requests network metrics from the node collected using a network metric monitoring approach that differs from that of the particular type of network metric monitoring agent. The device obtaining, by the device, the network metrics collected by the node. The device combines the network metrics collected by the node with results from an agent of the particular type of network monitoring agent, to identify a root cause of a performance degradation in the network.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
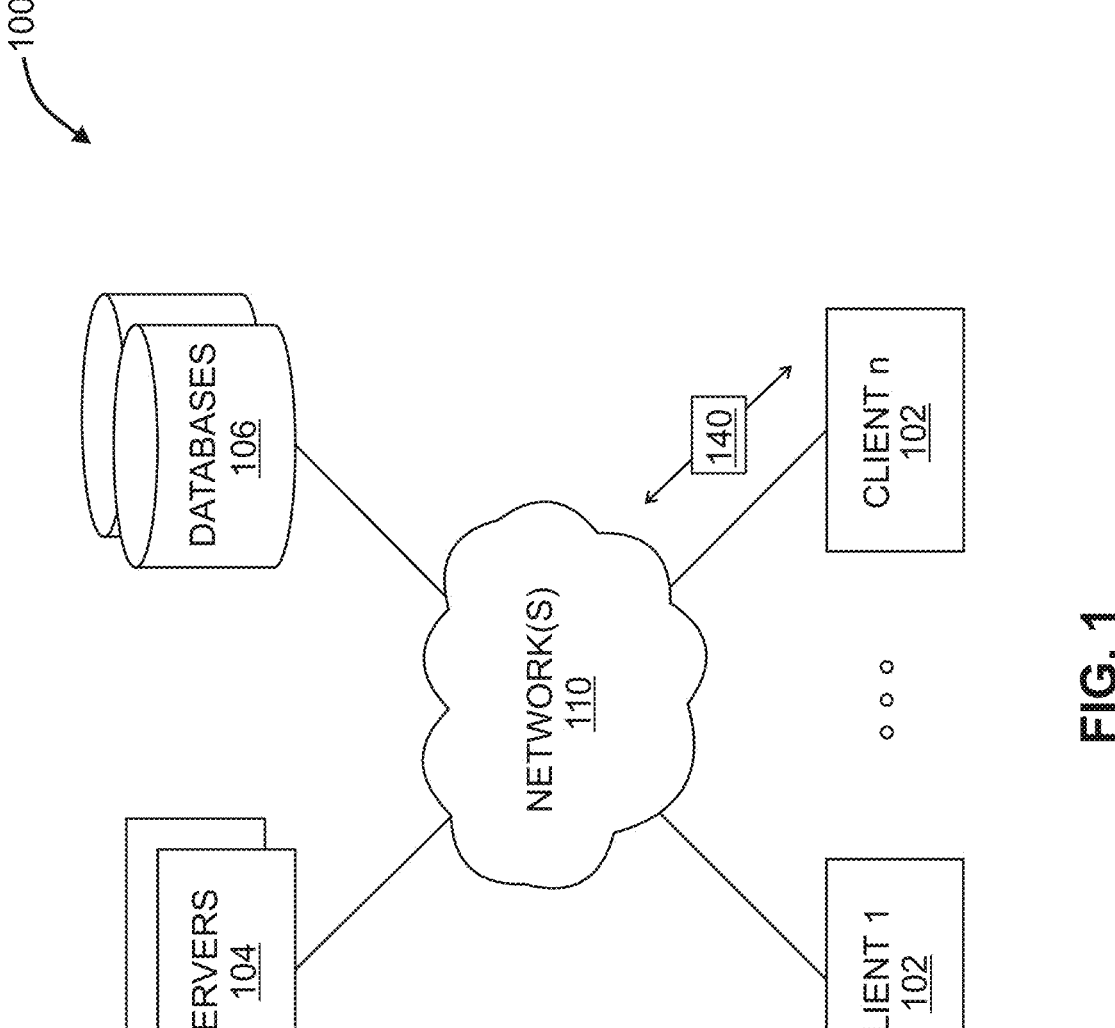
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
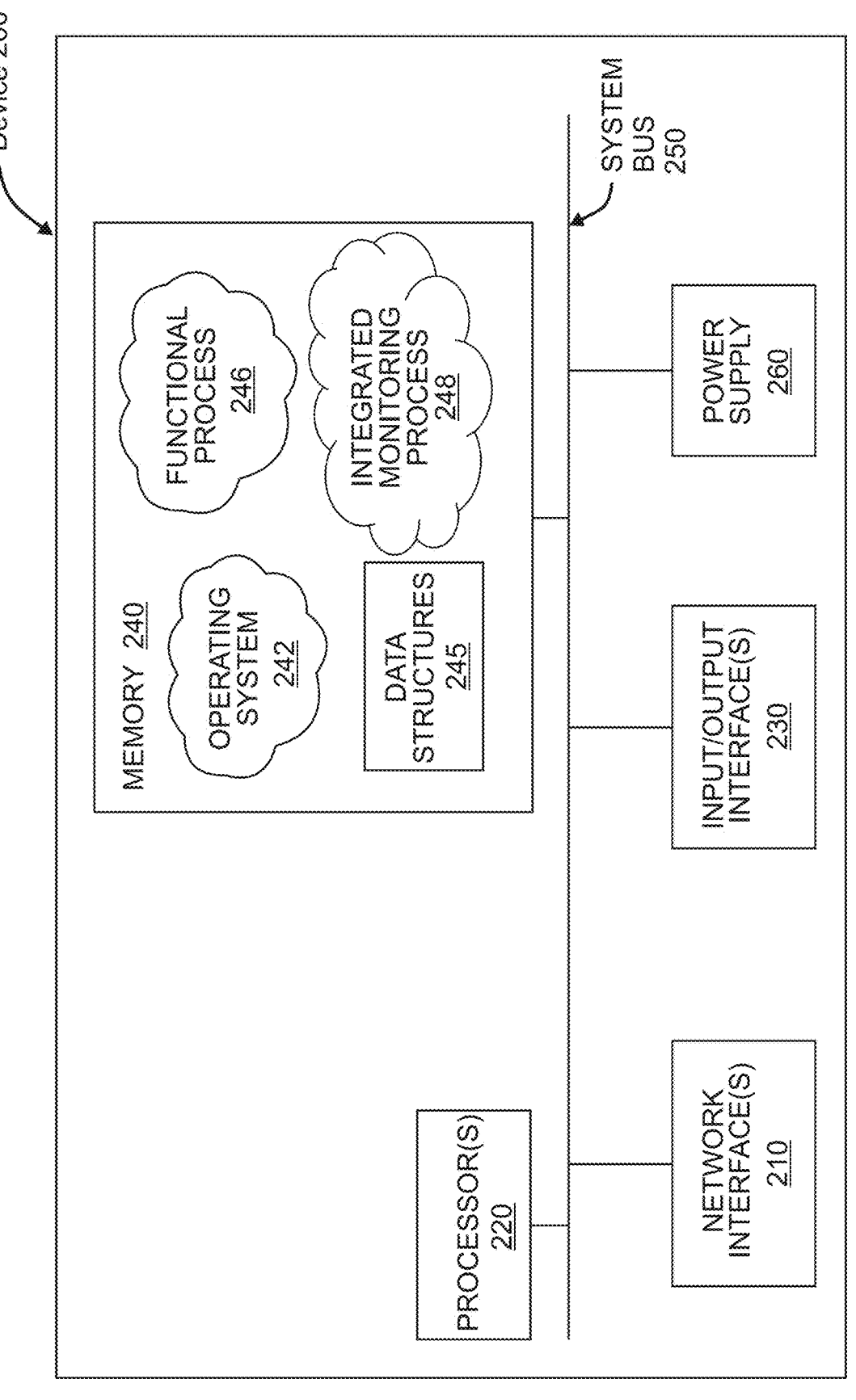
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as integrated monitoring process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, integrated monitoring process 248 may include computer executable instructions that, when executed by processor 220, cause device 200 to perform the techniques described herein. To do so, in some implementations, integrated monitoring process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, integrated monitoring process 248 may employ and/or be utilized to handle prompts to and/or access of one or more supervised, unsupervised, or semi-supervised machine learning models. integrated monitoring process 248 may employ and/or be utilized to handle prompts to and/or access of one or more supervised, unsupervised, or semi-supervised machine learning models trained to generate configurations for a network performance monitoring tool (e.g., Cisco's Internet Protocol Service Level Agreement (IP SLA)) for monitoring of a target, identify devices in a network and/or their capabilities, identify performance metrics, identify performance metric patterns, identify performance metric timelines, identify performance metric and component relationships, identify relationships between performance metrics and anomalies, anomaly detection, perform performance metric-based characterizations (e.g., scoring), perform root cause analysis, etc.

Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that integrated monitoring process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, integrated monitoring process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, integrated monitoring process 248 may be a component of, use, and/or be utilized in the management of prompts/access to a generative model to generate configurations, analyses, root cause analysis, or other outputs based on a conversational input from a user (e.g., voice, text, etc.). In another example, integrated monitoring process 248 may utilize a generative model with a method invocation data collector (MIDC) to assist in automated or manual identification of transactional attributes for spans. In yet another example, integrated monitoring process 248 may be utilize a generative model to generate configurations for a network performance monitoring tool (e.g., Cisco IP SLA) for monitoring of a target, identify devices in a network and/or their capabilities, identify performance metrics, identify performance metric patterns, identify performance metric timelines, identify performance metric and component relationships, identify relationships between performance metrics and anomalies, anomaly detection, perform performance metric-based characterizations (e.g., scoring), perform root cause analysis, etc. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
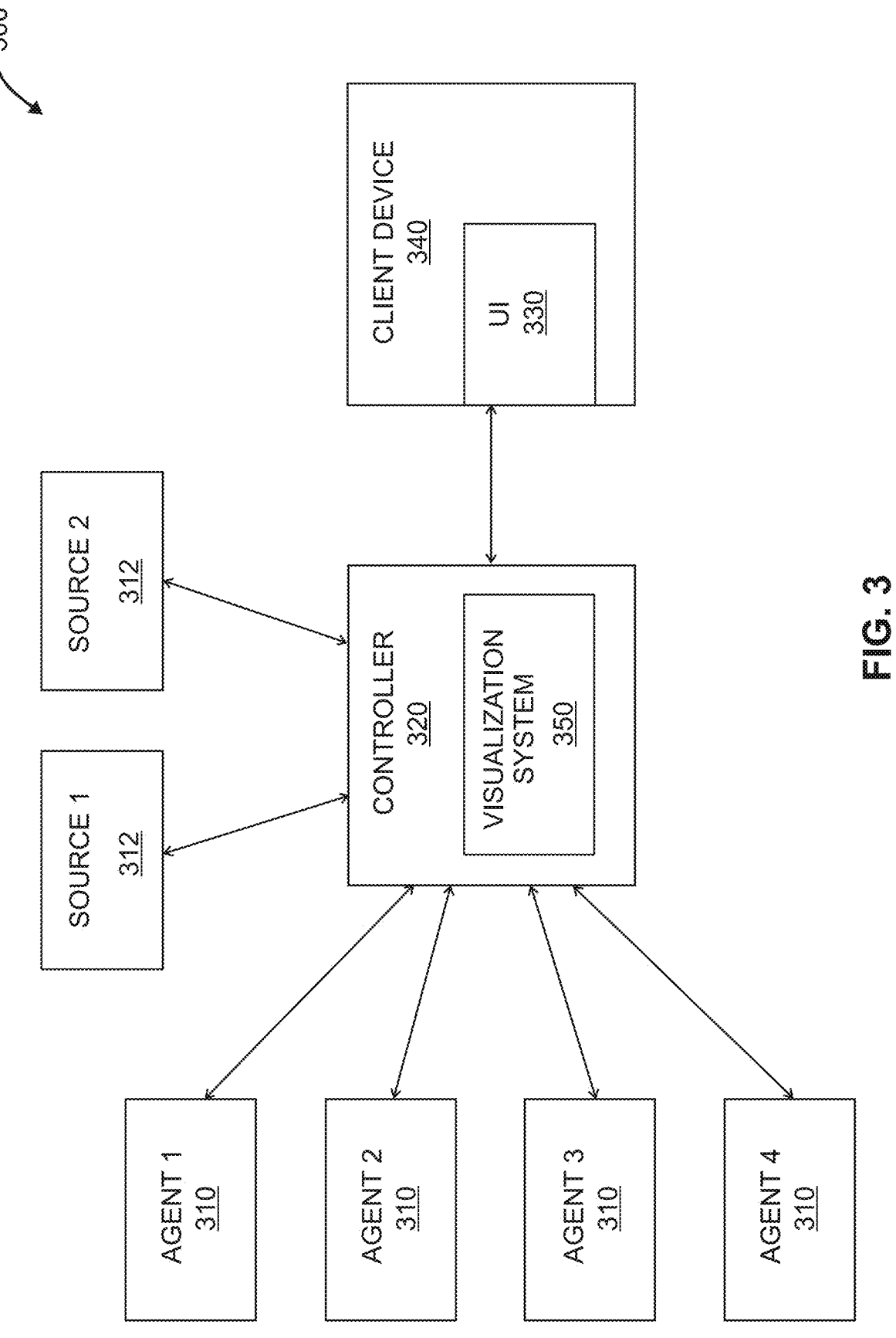
FIG. 3 illustrates an example observability intelligence platform.

FIG. 3 is a block diagram of an example of an observability intelligence platform 300 that can implement one or more aspects of the techniques herein. The observability intelligence platform 300 is a system that monitors and collects metrics of performance data for a network and/or application environment being monitored. At the simplest structure, the observability intelligence platform 300 includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform 300. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, current network monitoring solutions require the deployment of an ANPM agent on every possible path through which traffic can flow, necessitating installation of monitoring agents on all switches, routers, and endpoints within the network. Usually, this comprehensive of a deployment is not feasible since many network devices do not support the installation of ANPM agents, are resource limited, have prohibitory security requirements, etc. Ultimately, this leaves gaps in the monitoring coverage and when an outage occurs on a network device that does not have an ANPM agent installed, the exact location and cause of the outage cannot be pinpointed.

——Integrated Active Network Performance Monitoring Across Vantage Points——

In contrast, the techniques described herein introduce a mechanism to provide observability and measurement by integrating active network performance monitoring from on-path vantage points (e.g., using an active network performance measurement protocol, such as Cisco IP SLA, running locally on network devices) into wider ANPM cloud-based solutions, such as ThousandEyes. A user may leverage the additional insights provided by the integration to narrow down performance issues to a device which is in the network but not necessarily part of the path of any of the installed ANPM agent tests.

In short, these techniques extend test coverage, and offload the actual probing (e.g., scheduling, connection management, measurements, etc.) to network devices. This can facilitate testing to capture timestamps "closer to the wire" for network devices where an ANPM enterprise agent does not run locally, because the enterprise agent is not supported by the platform/hardware model. In this manner, an ANPM enterprise agent can run remotely off-path (e.g., in a virtual appliance), but still utilize timestamps that only strictly cover the link being monitored.

Illustratively, the techniques described herein may be performed by hardware, software, and/or firmware, such as in accordance with integrated monitoring process 248, which may include computer executable instructions executed by the processor 220 (or independent processor of interfaces 210) to perform functions relating to the techniques described herein.

Specifically, according to various implementations, a device identifies a node in a network that is not running a particular type of network metric monitoring agent. The device requests network metrics from the node collected using a network metric monitoring approach that differs from that of the particular type of network metric monitoring agent. The device obtaining, by the device, the network metrics collected by the node. The device combines the network metrics collected by the node with results from an agent of the particular type of network monitoring agent, to identify a root cause of a performance degradation in the network.

Figure 4:
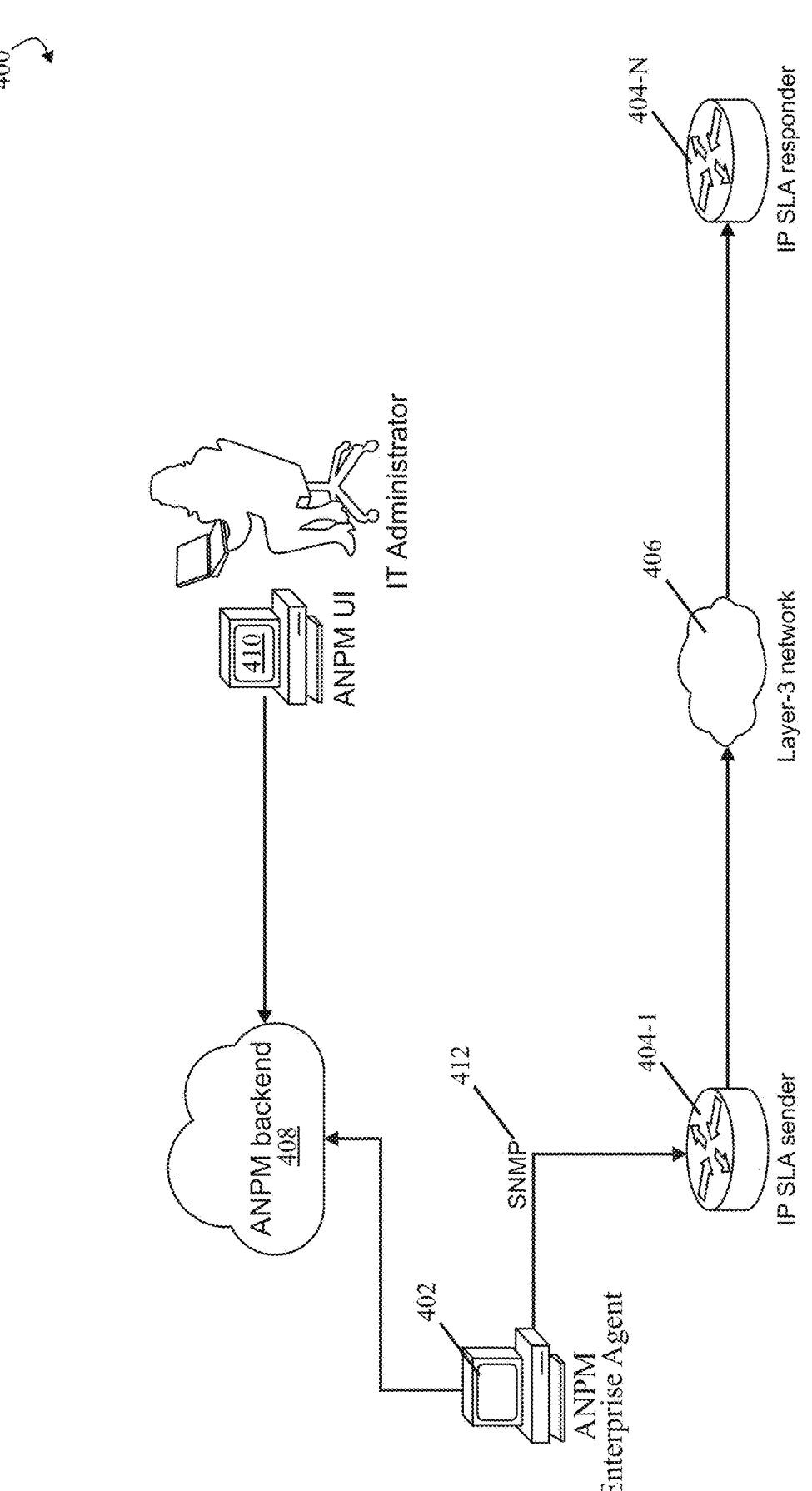
FIG. 4 illustrates an example of an architecture for integrated active network performance monitoring across vantage points.

Operationally, FIG. 4 illustrates an example of an architecture 400 for integrated active network performance monitoring across vantage points, according to various implementations. Architecture 400 may include an ANPM enterprise agent 402. Examples of an ANPM enterprise agent 402 may include any software component used in network performance monitoring systems that is designed to be deployed on various network devices, such as servers, virtual machines, or dedicated appliances, to actively monitor and collect data on network performance and health. For example, an ANPM enterprise agent 402 may include a network performance monitoring software component (e.g., such as a ThousandEyes enterprise agent, etc.) that is executable to perform synthetic traffic generation, path trace analysis, application performance monitoring, device health monitoring, data aggregation and reporting, etc.

In architecture 400, an ANPM enterprise agent 402 may be deployed within and/or communicatively coupled to a network. The ANPM enterprise agent 402 may be configured to perform discovery of, communication with, and/or polling 412 (e.g., utilizing a device management and/or data retrieval protocol such as SNMP) of network devices 404 (e.g., 404-1 . . . 404-N) to retrieve performance metrics. One or more of these network devices 404 may be configured with/running network performance measurement protocols (e.g., Cisco IP SLA, two-way active measurement protocol (TWAMP), etc.).

Utilizing architecture 400, the ANPM enterprise agent 402 may poll a network device 404-1 in order to test a remote Layer-3 target (e.g., target network device 404-N). For example, ANPM enterprise agent 402 may perform polling 412 to retrieve network performance measurement protocol (e.g., Cisco IP SLA, TWAMP, etc.) performance metrics from network device 404-1. Network device 404-1 may operate as a network performance measurement protocol (e.g., Cisco IP SLA, TWAMP, etc.) sender, performing network performance measurement operations (e.g., creating synthetic traffic or otherwise measuring key performance metrics such as latency, jitter, packet loss, etc.) across a Layer-3 network 406 in concert with the target network device 404-N which may operate as a network performance measurement protocol (e.g., Cisco IP SLA, TWAMP, etc.) responder. In various implementations, the network device 404-1 and/or the target network device 404-N may be prohibited from supporting the ANPM enterprise agent 402 on the device.

The results (e.g., key performance metrics collected via IP SLA, etc.) may be retrieved by the ANPM enterprise agent 402 and/or pushed to an ANPM backend 408 (e.g., ThousandEyes backend). ANPM backend 408 may obtain, store, analyze, transform, incorporate, etc. the results to generate a characterization of network performance that may be provided to an IT administrator via an ANPM user interface 410.

Therefore, architecture 400 may provide observability and performance measurement by integrating active network performance monitoring from on-path vantage points (e.g., network devices 404), where the enterprise agent is not supported by the platform/hardware model, into wider ANPM cloud-based solutions. Through this integration, performance issues may be identified even when they involve a device which is in the network but not necessarily part of the path of any of the installed ANPM agent tests.

Additionally, tests conducted leveraging architecture 400 may capture timestamps "closer to the wire" for network devices 404 where the ANPM enterprise agent 402 does not run locally, because the enterprise agent is not supported by the platform/hardware model. In this manner, the ANPM enterprise agent 402 can run remotely off-path (e.g., in a virtual appliance), while still using timestamps that only strictly cover the link being monitored.

Figure 5:
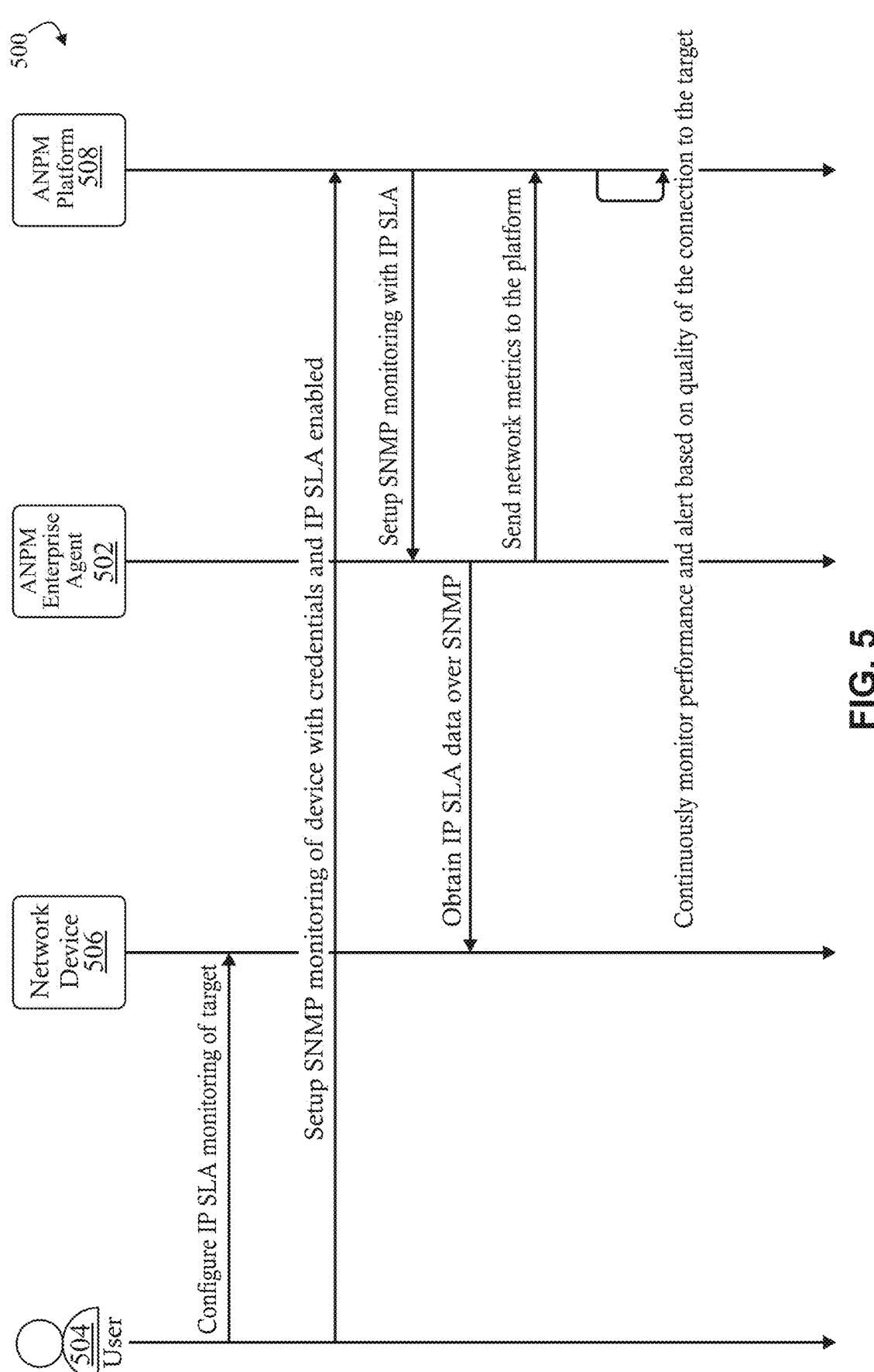
FIG. 5 illustrates an example of a process flow for integrated active network performance monitoring across vantage points.

FIG. 5 illustrates an example of a process flow 500 for integrated active network performance monitoring across vantage points, according to various implementations. The process flow 500 leverages an ANPM enterprise agent 502 (e.g., ThousandEyes enterprise agent). The ANPM enterprise agent 502 is configured with the functionality to discover and monitor devices via a device management and/or data retrieval protocol (e.g., the example of SNMP is given, but it should be appreciated that it is merely an example protocol to manage devices and retrieve data from them, that is not meant to necessarily limit the disclosure). The ANPM enterprise agent 502 can also collect path-trace data and network metrics like latency, loss, jitter, etc. from the vantage point of the ANPM enterprise agent 502 to some target defined in a test.

The ANPM enterprise agent 502 may be installed on one or more device in a network. In some instances, ANPM enterprise agent 502 may be installed and/or executed on a virtual appliance that is off the network path where the target devices are being tested. That is, the ANPM enterprise agent 502 may not be able to directly test or launch a test from a target device itself (e.g., directly using its inherent network performance testing functionalities). From this device(s), the ANPM enterprise agent 502 may perform a discovery operation (e.g., an SNMP-based discovery operation, etc.) to identify other devices in the network. For each device identified in this operation, a check may be performed as to whether that device supports an alternative active network performance measurement approach (e.g., Cisco IP SLA, TWAMP, etc.).

This alternative active network performance measurement approach that is present on each discovered device may be one that is already operable on that device (e.g., no additional agent install needed). This preexisting alternative active network performance measurement approach present on each discovered device may be a protocol or approach that is different from the protocol, approach, functionalities, agents, etc. utilized by the ANPM enterprise agent 502. For instance, the alternative active network performance measurement approach present on each discovered device may be one that performs the collection of network performance metrics without the execution of an instance of the ANPM enterprise agent 502 on that device. Again, these discovered devices may be devices that do not support the ANPM enterprise agent 502.

For the discovered devices that support this alternative active network performance measurement approach, active network performance monitoring data (e.g., network performance metrics, synthetic traffic, time stamps, etc.) may be collected from the perspective of one or more of those devices. In various implementations, synthetic traffic and/or the network performance metrics of the active network performance monitoring may be looped back to the test agent, adding receival and transmission timestamps, allowing the ANPM enterprise agent 502 to derive latency (including one-way, assuming the devices are in time sync), jitter, and/or loss exclusively related to the remote device.

In process flow 500, a user 504 may configure a monitoring (e.g., Cisco IP SLA, TWAMP, etc.) of a target with network device 506. User 504 may setup SNMP monitoring of the target with its necessary credentials and the Cisco IP SLA, TWAMP, etc. enabled with an ANPM platform 508. The ANPM platform 508 may then setup SNMP monitoring with Cisco IP SLA, TWAMP, etc. on the ANPM enterprise agent 502. In various implementations, the ANPM enterprise agent 502 may perform an SNMP discovery within a particular IP Address range to find devices that are reachable over SNMP (e.g., with the credentials configured in the ANPM enterprise agent 502).

The ANPM enterprise agent 502 may send an SNMP request to the network device 506 to retrieve the Cisco IP SLA, TWAMP, etc. test statistics for the operation. The network device 506 may return the last measurements of network performance test executed regularly towards the target, that are cached locally. The data collected by the ANPM enterprise agent 502 may be sent to the backend (e.g., ANPM platform 508) for processing. ANPM platform 508 may continuously monitor performance and/or generate alters based on the quality of the connection to the target.

Again, SNMP is offered as an example protocol to manage devices and retrieve data from them, that is not meant to necessarily limit the disclosure.

Figure 6:
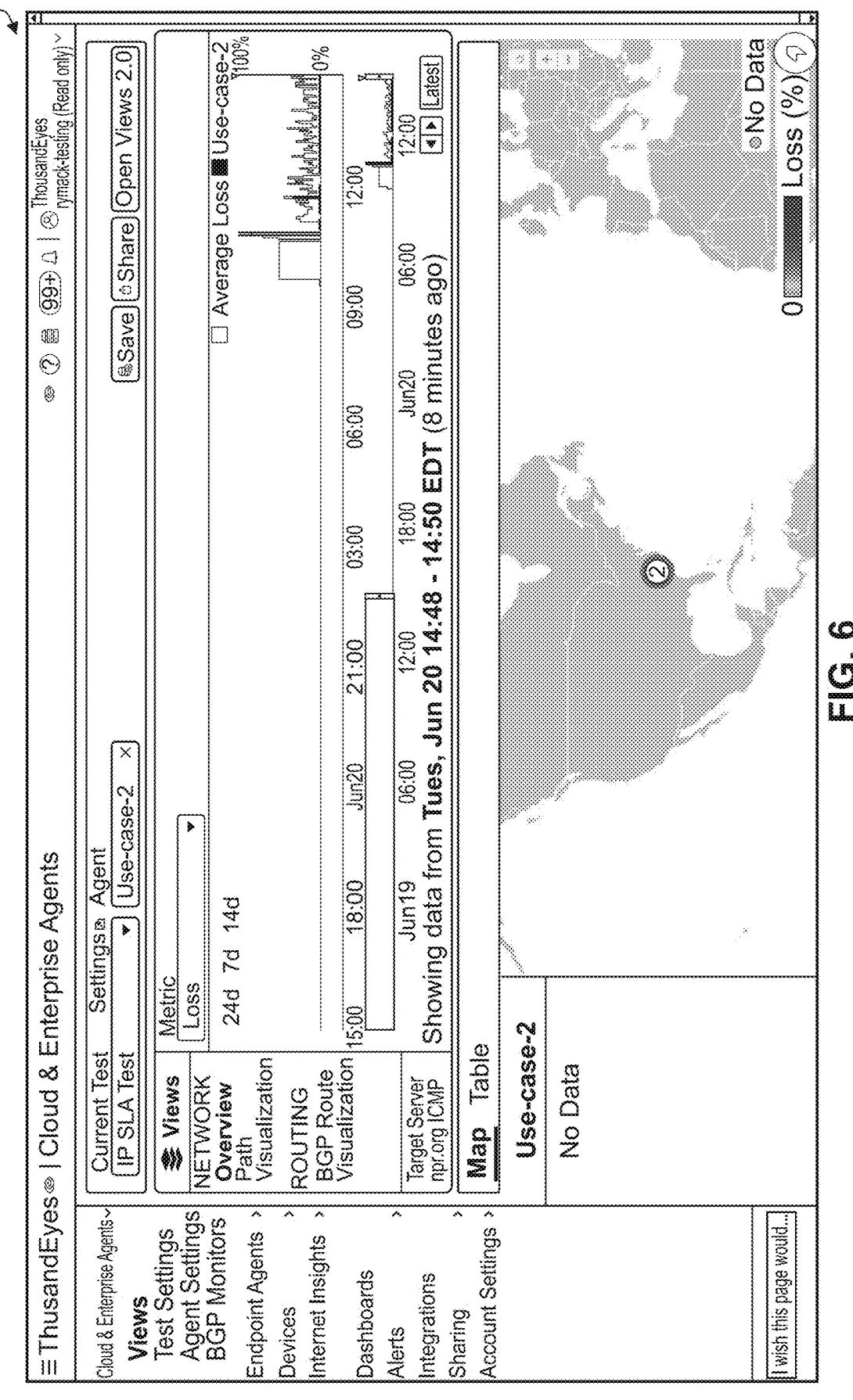
FIG. 6 illustrates an example of an output generated by integrated active network performance monitoring across vantage points.

FIG. 6 illustrates an example of an output 600 generated by integrated active network performance monitoring across vantage points, according to various implementations. The output 600 may be a portion of an observability intelligence platform network monitoring user interface. Here, the output 600 is a visualization of the results of a test designated to collect data about the quality of a connection to a target device, which is actually performed by Cisco IP SLA, TWAMP, etc. on the network device and then integrated into the ANPM backend via an ANPM enterprise agent that is not installed and/or executing on the testing network device that probed for and/or collected the network metrics. The data returned from the test is utilized by the ANPM backend to generate the output 600 to produce a visualization of the quality of the connection in the UI. Therefore, the test coverage of the ANPM backend and/or the ANPM enterprise agent is extended to include these Cisco IP SLA, TWAMP, etc. vantage points.

Figure 7:
FIG. 7 illustrates an example of a simplified procedure for integrated active network performance monitoring across vantage points, in accordance with one or more implementations described herein.

FIG. 7 illustrates an example of a simplified procedure for integrated active network performance monitoring across vantage points, in accordance with one or more implementations described herein. For example, a non-generic, specifically configured device (e.g., device 200), may perform procedure 700 (e.g., a method) by executing stored instructions (e.g., integrated monitoring process 248). The procedure 700 may start at step 705, and continues to step 710, where, as described in greater detail above, the device (e.g., a controller, processor, etc.) may identify a node in a network that is not running a particular type of network metric monitoring agent. In some implementations, the node is identified using a simple network management protocol (SNMP) discovery operation within a particular Internet Protocol address range. In various cases, the device is a supervisory device for a plurality of agents of the particular type of network monitoring agent deployed in the network (e.g., as a part of a network observability platform).

At step 715, as detailed above, the device may request network metrics from the node collected using a network metric monitoring approach that differs from that of the particular type of network metric monitoring agent. In various implementations, the network metric monitoring approach is the Cisco Internet Protocol Service Level Agreement (IP SLA) monitoring.

At step 720, the device may obtain the network metrics collected by the node, as described in greater detail above. In various implementations, the device requests and obtains the network metrics from the node via the agent of the particular type of network monitoring agent. In some instances, the network metrics collected by the node include one or more of: latency, jitter, or loss to another node in the network that is also not running the particular type of network metric monitoring agent.

At step 725, as detailed above, the device may combine the network metrics collected by the node with results from an agent of the particular type of network monitoring agent, to identify a root cause of a performance degradation in the network. In various cases, the agent of the particular type of network monitoring agent is executed by a second node in the network. In one implementation, the results from the agent of the particular type of network monitoring agent comprise path trace results. In a further implementation, the agent of the particular type of network monitoring agent is run in a virtual appliance off a path in the network being monitored by the node. In some implementations, the device may also generate an alert when a connection between the agent of the particular type of network monitoring agent and the node is interrupted. In a further implementation, the device may provide an indication of the root cause of the performance degradation to a user interface.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce a mechanism to provide observability and measurement by integrating active network performance monitoring from on-path vantage points (e.g., using an active network performance measurement protocol, such as Cisco IP SLA, running locally on network devices) into wider ANPM cloud-based solutions, such as ThousandEyes. A user may leverage the additional insights provided by the integration to narrow down performance issues to a device which is in the network but not necessarily part of the path of any of the installed ANPM agent tests. In short, these techniques extend test coverage, and offload the actual probing (e.g., scheduling, connection management, measurements, etc.) to network devices.

These techniques can provide enhanced visibility over the current approaches to network monitoring. Unlike the existing approaches, which rely on adding support for running an enterprise agent on as many platforms as possible to increase visibility, these techniques provide visibility for even more platforms without needing to add support for running natively on those platforms.

While there have been shown and described illustrative implementations that provide for integrated active network performance monitoring across vantage points, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

identifying, by a device, a node in a network that is not running a particular type of network metric monitoring agent;

requesting, by the device, network metrics from the node collected using a network metric monitoring approach that differs from that of the particular type of network metric monitoring agent;

obtaining, by the device, the network metrics collected by the node; and combining, by the device, the network metrics collected by the node with results from an agent of the particular type of network monitoring agent, to identify a root cause of a performance degradation in the network.

2. The method as in claim 1, wherein the node is identified using a simple network management protocol (SNMP) discovery operation within a particular Internet Protocol address range.

3. The method as in claim 1, wherein the device requests and obtains the network metrics from the node via the agent of the particular type of network monitoring agent.

4. The method as in claim 1, wherein the network metric monitoring approach is Internet Protocol Service Level Agreement (IP SLA) monitoring.

5. The method as in claim 1, wherein the agent of the particular type of network monitoring agent is executed by a second node in the network.

6. The method as in claim 1, wherein the results from the agent of the particular type of network monitoring agent comprise path trace results.

7. The method as in claim 1, wherein the device is a supervisory device for a plurality of agents of the particular type of network monitoring agent deployed in the network.

8. The method as in claim 1, wherein the network metrics collected by the node include one or more of: latency, jitter, or loss to another node in the network that is also not running the particular type of network metric monitoring agent.

9. The method as in claim 1, wherein the agent of the particular type of network monitoring agent is run in a virtual appliance off a path in the network being monitored by the node.

10. The method as in claim 1, further comprising:

generating an alert when a connection between the agent of the particular type of network monitoring agent and the node is interrupted.

11. An apparatus, comprising:

one or more network interfaces;

a processor coupled to the one or more network interfaces and configured to execute one or more processes; and a memory configured to store a process that is executable by the processor, the process when executed configured to:

identify a node in a network that is not running a particular type of network metric monitoring agent;

request network metrics from the node collected using a network metric monitoring approach that differs from that of the particular type of network metric monitoring agent;

obtain the network metrics collected by the node; and combine the network metrics collected by the node with results from an agent of the particular type of network monitoring agent, to identify a root cause of a performance degradation in the network.

12. The apparatus as in claim 11, wherein the node is identified using a simple network management protocol (SNMP) discovery operation within a particular Internet Protocol address range.

13. The apparatus as in claim 11, wherein the apparatus requests and obtains the network metrics from the node via the agent of the particular type of network monitoring agent.

14. The apparatus as in claim 11, wherein the network metric monitoring approach is Internet Protocol Service Level Agreement (IP SLA) monitoring.

15. The apparatus as in claim 11, wherein the agent of the particular type of network monitoring agent is executed by a second node in the network.

16. The apparatus as in claim 11, wherein the results from the agent of the particular type of network monitoring agent comprise path trace results.

17. The apparatus as in claim 11, wherein the apparatus is a supervisory device for a plurality of agents of the particular type of network monitoring agent deployed in the network.

18. The apparatus as in claim 11, wherein the network metrics collected by the node include one or more of: latency, jitter, or loss to another node in the network that is also not running the particular type of network metric monitoring agent.

19. The apparatus as in claim 11, wherein the agent of the particular type of network monitoring agent is run in a virtual appliance off a path in the network being monitored by the node.

20. A tangible, non-transitory, computer-readable medium storing program instructions that cause a device to execute a process comprising:

identifying a node in a network that is not running a particular type of network metric monitoring agent;

configuring the node to collect network metrics;

obtaining the network metrics collected by the node; and combining the network metrics collected by the node with results from an agent of the particular type of network monitoring agent to identify a root cause of a performance degradation in the network.

\* \* \* \* \*